Oct. 6, 1936.  L. L. SCHAUER  2,056,909
HYDRAULIC MOTOR UNIT
Original Filed June 14, 1932   3 Sheets-Sheet 1
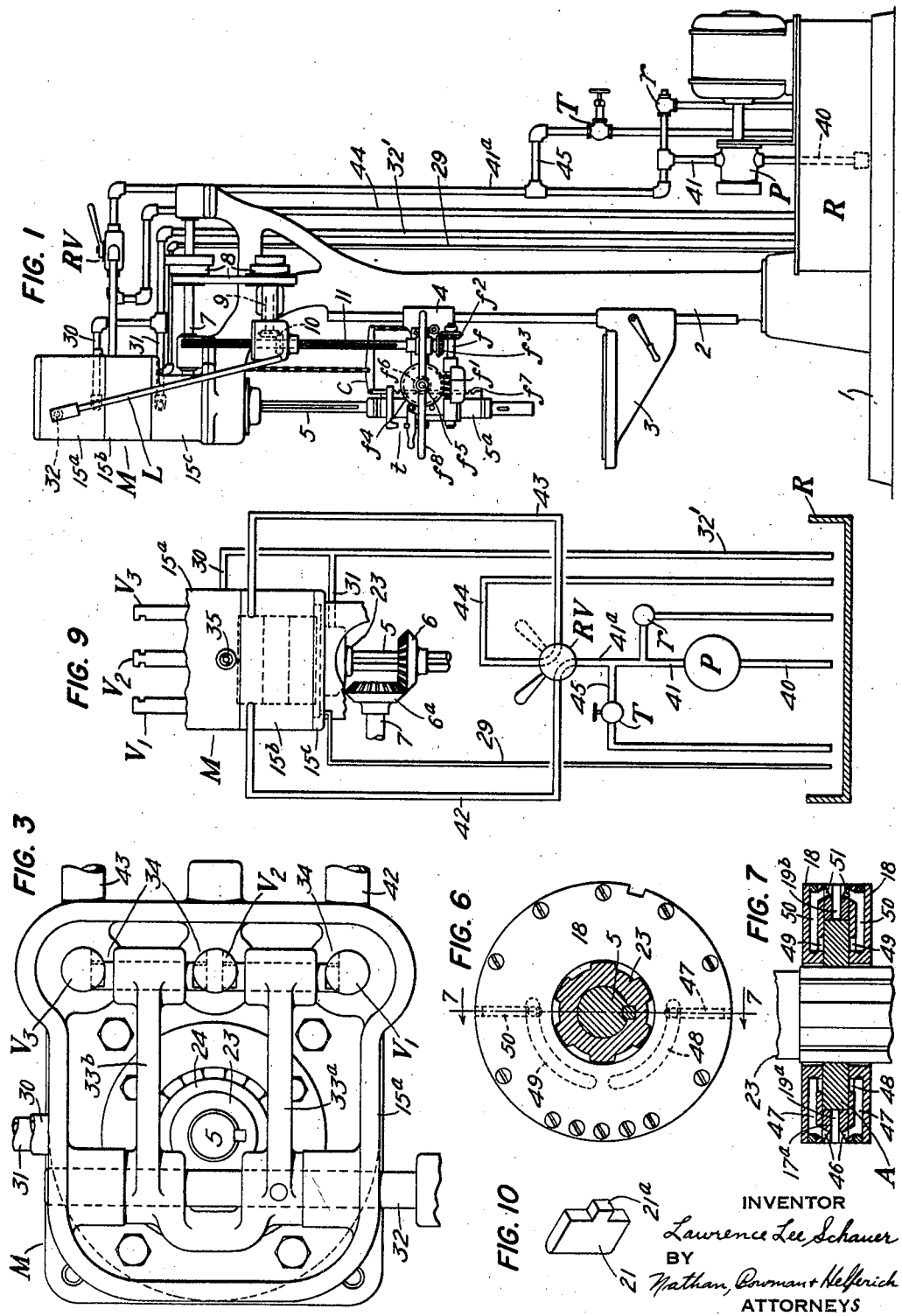

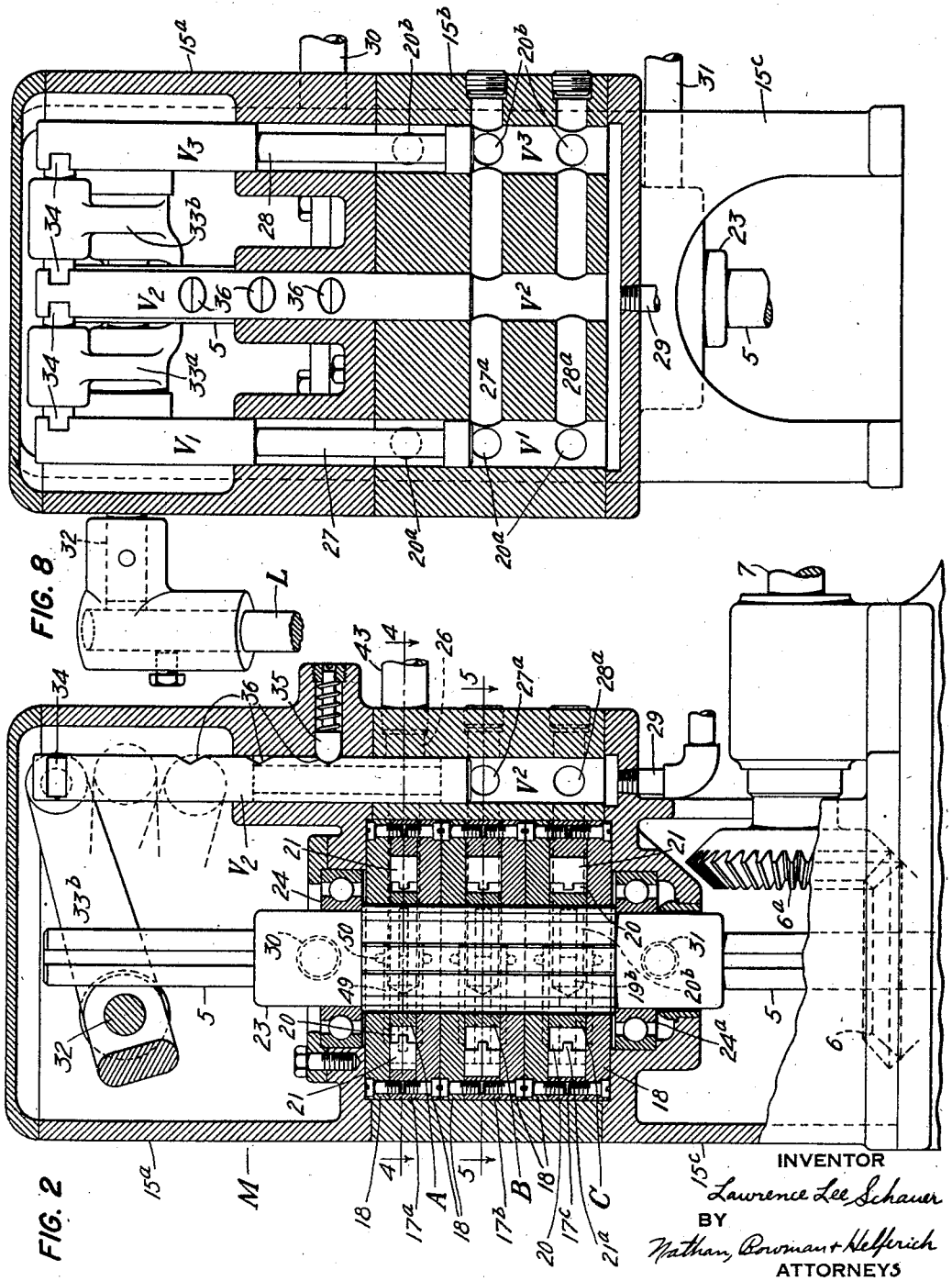

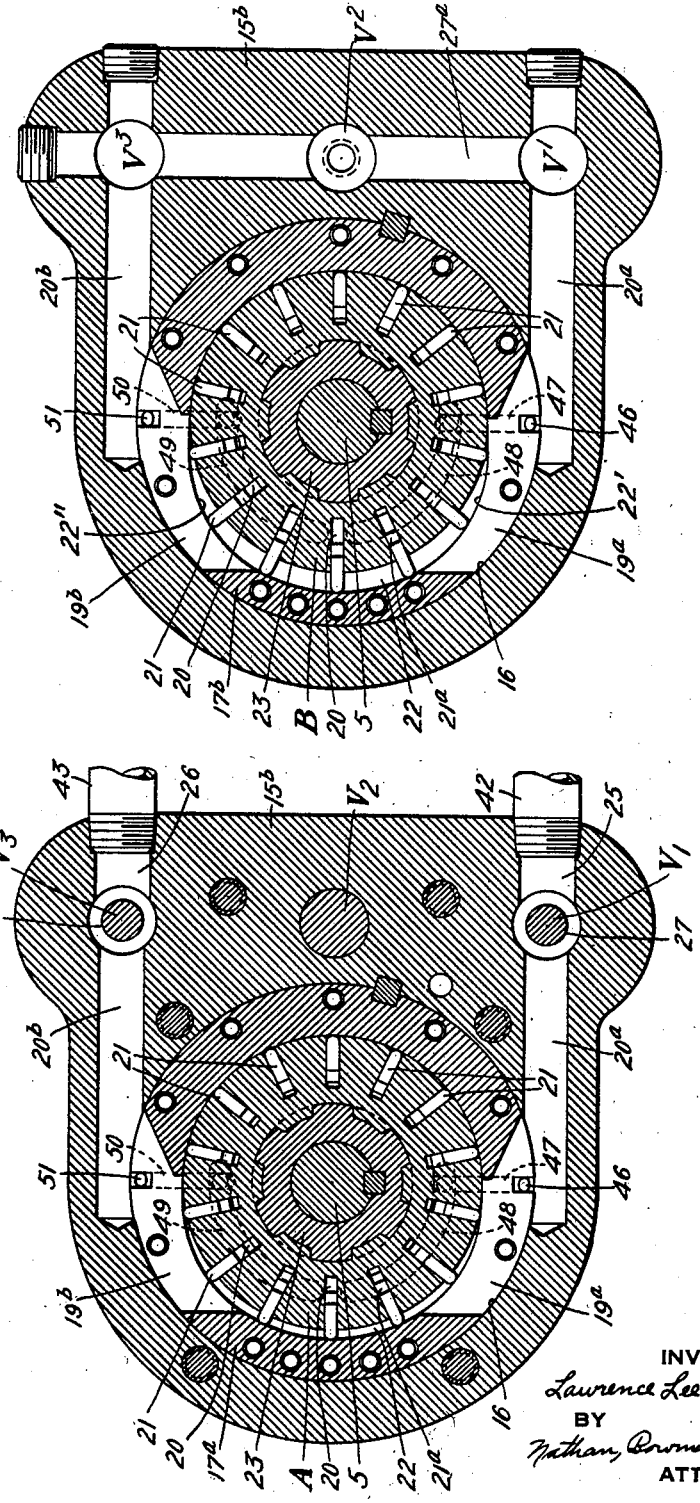

Patented Oct. 6, 1936

2,056,909

UNITED STATES PATENT OFFICE 2,056,909

HYDRAULIC MOTOR UNIT

Lawrence Lee Schauer, Wyoming, Ohio, assignor to The Cincinnati Bickford Tool Company, Cincinnati, Ohio, a corporation of Ohio Original application June 14, 1933, Serial No. 675,652. Divided and this application February 10, 1934, Serial No. 710,698

5 Claims. (Cl. 121—92)

This invention relates to improvements in hydraulic transmissions and is a division of my copending application, Serial No. 675,652, filed June 14, 1933. The invention is concerned more particularly with the conversion of fluid energy into mechanical energy with a greater degree of efficiency than has heretofore been obtained.

Other objects and advantages will be in part indicated in the following description and in part rendered apparent therefrom in connection with the annexed drawings.

In the attainment of the objectives of this invention, it is proposed to construct a motor unit made up of a casing and a plurality of rotor elements of various sizes and volumetric capacities and to arrange same in such manner as to utilize substantially the entire output of the supply pump or other source of supply fluid in effecting various motor speeds and, in this way, obtain maximum efficiency.

In its broadest aspects the invention will serve a useful purpose in any environment wherein it is desired to impart a plurality of different rates of movement to a driven element. In machine tools, for example, and more particularly a drilling machine, the element driven will usually be the drill spindle. In such a case the motor unit, therefore, is preferably splined or keyed directly thereto in such manner as to permit movement of the spindle in an axial direction under the action of suitable feed mechanism while the spindle is being driven by the hydraulic motor. In other types of machines the spindle or other driven element may not move axially relative to the unit and therefore the splined connection may be dispensed with.

Selector valve means are provided for effecting major speed changes and which when placed in one position, directs the supply fluid to but one of the rotors thereby to drive same and effect a relatively high rotary speed to the driven element, or if the valve is set in another position two rotors are actuated by the same volume of oil and a different rate of movement ensues; or if the valve is in a third position a third rotor is connected into the system and a third speed is obtained. The more rotors that are connected in parallel the more slow will be the driven speed and conversely.

In addition to the above mentioned selector valve it is proposed to incorporate means for regulating the rate of flow in the motor supply line so that changes in speed may be effected intermediate those produced by the selector valve and thus render the mechanism capable of variations in speed from zero to maximum by increments infinitesimal.

To enable others skilled in the art so fully to apprehend the underlying features hereof that they may embody the same in the various ways contemplated by this invention, drawings depicting a preferred construction of motor and a typical embodiment thereof in a machine tool have been annexed as a part of this disclosure and, in such drawings, like characters of reference denote corresponding parts throughout all the views, of which:—

Figure 1 is an illustration of a representative type of machine tool incorporating the present invention.

Fig. 2 is an enlarged detail, in vertical section, of the motor unit.

Fig. 3 is a plan view of the unit with the cover removed.

Figs. 4 and 5 are horizontal sectional views of the unit taken along lines 4—4, 5—5 respectively of Fig. 2.

Fig. 6 is a plan view of one of the rotors and rotor valve plates; and Fig. 7 is a sectional view thereof along lines 7—7.

Fig. 8 is a sectional view of the selector valves and oil circulating valve which together control the flow of oil through and within the motor unit.

Fig. 9 is a circuit diagram of an hydraulic system.

Fig. 10 is a perspective view of one of the vanes of a rotor.

Referring now more particularly to Fig. 1 of the drawings, for convenience a representative type of machine tool, namely, a drilling machine, is illustrated and to which this invention is peculiarly adapted. In general, the drilling machine comprises a base or support 1 and an upstanding column 2 upon which a work support 3 and a tool head 4 are adjustably mounted. The upper end of the column 2 has mounted thereon the hydraulic driving motor unit M that rotates the spindle 5 and which will later be explained in greater detail. The motive power to effect feed movements of the spindle is taken from the spindle as by means of the bevel gears 6 and 6ª and which through shaft 7, change speed mechanism 8, shaft 9, bevel gears 10 rotates the power feed shaft 11 in a forward or reverse direction depending upon the direction of rotation of the spindle.

The lower end of the feed shaft is journaled in the adjustable head 4 and is operatively connected with the spindle feed mechanism also carried by the head. The features of this portion of a suitable spindle feed means forms no part of the present invention and is set forth in greater clearness in United States Patent No. 1,746,265 to which reference may be had for further details. Briefly, it includes a swing or drop shaft $f$ upon which is mounted a worm gear $f_1$ and a bevel gear $f_2$. The gear $f_2$ engages a gear $f_3$ on the feed shaft and is driven thereby. When the drop shaft $f$ is moved and latched into power feed position, the gear $f_1$ rotates worm wheel $f_4$ which in turn rotates a pinion shaft $f_5$. The inner end of the pinion shaft is provided with a pinion $f_6$ that meshes with rack teeth $f_7$ formed upon the spindle sleeve $5^a$ and in this way the spindle may be elevated or lowered by power. Tripping mechanism, indicated generally as $t$ is provided for disconnecting the worm $f_1$ from the worm wheel $f_4$ automatically when the spindle has been fed the proper distance. A hand wheel or lever $f_8$ secured to the shaft $f_5$ provides means for effecting feed or traverse movements of the spindle which is at all times counterweighted by the mechanism $c$.

The hydraulic driving motor M for the spindle is mounted on the column preferably at the upper end thereof and in axial alignment with the tool spindle 5, and comprises a 3-part casing $15^a$, $15^b$ and $15^c$. The upper and lower sections $15^a$ and $15^c$ provide the bearings for supporting the upper end of the shaft 5 and other mechanisms later to be referrerd to, and the center section $15^b$ provide the motor housing proper within which a plurality of rotors A, B and C are contained.

Each of the rotors, A, B and C is splined or otherwise secured to a non-translatable sleeve member 23 which, in turn, has a keyed or splined connection with the spindle shaft 5, the ends of the sleeve 23 being rotatably mounted in journal bearings 24 and $24^a$ provided by the upper and lower sections $15^a$ and $15^c$ of the motor unit. In this way rotary movement of the rotor or rotors is transmitted directly to the spindle shaft, the latter being mounted as to be freely movable endwise in the sleeve 23 under the action of the manual or power feed mechanisms hereinbefore mentioned to effect the "feed" action.

Referring to Figs. 2, 4, 5 and 6, it will be noted, that the motor housing $15^b$ is formed with a central aperture 16 within which are keyed or otherwise secured a plurality of slotted ring members $17^a$, $17^b$ and $17^c$. Each of these rings is isolated from the one adjacent by grooved discs 18 and in effect provides a single cylinder for the vanes of its respective rotor. Each ring is also provided with intake and discharge ports or slots $19^a$ and $19^b$, oppositely disposed and in registry with intake and discharge channels $20^a$ and $20^b$ respectively that are formed in the housing $15^b$.

Figs. 4 and 5 illustrate more clearly the construction of the rotors and arrangement of ports etc., Fig. 4 representing a section through the A rotor and Fig. 5 a section through the B rotor. Referring to Figs. 2 and 5, it will be seen, that the rotor B comprises a circular shaped disc of substantial thickness and which is provided with a plurality of radially disposed slots 20. Each slot is provided with a reciprocably mounted blade member 21 of the same width as the rotor element.

A section of the inner surface of the ring $17^b$ is enlarged beyond the periphery of the disc B thereby forming a chamber or cavity 22 between the rotor and the ring within which the vanes or pistons 21, made preferably of wear resisting material, are adapted to be cyclically extended, by means later to be described. The near ends of the slots $19^a$ and $19^b$ are spaced apart a distance slightly greater than the distance between at least two of the blades 21 in the rotor so that there will always be one blade projecting into the cavity 22 preventing direct communication between the inlet and discharge ports $19^a$ and $19^b$ as the rotor turns.

Each end wall of the arcuate cavity 22 is inclined as at 22' and 22" to permit the blades 21 to move without shock into and out of their effective working positions.

To drive the rotor fluid under pressure is directed into conduit $20^a$ and from there it flows through slot $19^a$ into expansion chamber 22 behind one of the blades 21. The continued application of the fluid pressure acting against that portion of the vane 21 exposed, moves the vane forward in the chamber 22 until the next following vane closes off or passes the end of the intake slot $19^a$. The succeeding vane then becomes subjected to the action of the incoming pressure fluid and continues to turn the rotor. When the preceding blade has been moved a distance sufficient to uncover port $19^b$ the fluid trapped between the successive vanes is permitted to discharge therein and as the rotor advances further the vane is cammed inwardly by the inclined walls 22" and retained in its retracted position by the inner wall of the ring $17^b$. After the succeeding vanes have been moved in this manner the first vane reaches the inclined wall 21' where it once more moves outwardly to its effective working position and the cycle is again repeated.

During a complete revolution of a rotor supplied with a plurality of vanes as shown, each vane, it will be noted, not only acts as a piston moving in the work chamber 22 but each vane also partakes of the functions of a valve so that proper and timely valve action is automatically obtained between the common intake and discharge ports.

The amount or quantity of fluid transferred from the intake port to the discharge port for each revolution of the rotor, will, with a fourteen vane rotor, be fourteen times the volumetric capacity of the chamber 22 between two vanes, for a five vane rotor, five times the capacity of the chamber, for a nine vane rotor, nine times the capacity and so on; and if the rate of flow of fluid directed to the intake conduit $20^a$ is volumetrically constant it follows that the rate of movement of the rotor will be $$R = \frac{Q}{VN}$$

where R represents the rate in revolutions per minute, Q represents the quantity supplied in cubic inches per minute, V the volume of one of the chambers between two blades, and N the number of vanes or blades.

Variations in rate of rotation may be effected in various ways, such as, for example, reducing the rate of delivery of the pump or by-passing a portion of the flow through a pressure relief valve, but as these methods reduce the efficiency of the motor unit and result in large power losses because of friction and heating of the oil, such arrangements are not entirely satisfactory especially so in installations requiring a wide range of speeds. It is the object of this invention to provide a structure that may be driven at various preselected speeds without the ill effects mentioned above.

To this end I have arranged a plurality of rotors on the shaft to be driven and provide valve means for selectively directing the supply fluid to as many as desired. By arranging the valve in such manner as to connect at will two or more rotors in parallel, the amount or quantity of fluid supplied to any one rotor is materially lessened and a reduction in rate of movement of the driven shaft results. If two rotors of equal displacement or capacity are connected in parallel the new rate will be half that of one rotor; if three rotors are in parallel the new rate will be reduced to one third the rate of one rotor or two thirds the rate of two rotors; four rotors will produce a rate one fourth the rate of one rotor and three fourths the rate of three rotors, and so on.

The more rotors connected to the supply line the greater is the reduction in speed of the driven shaft and, it will be observed, each reduction in speed of the driven shaft is accompanied by a proportionate increase in torque or turning power of the shaft. In machine tool applications this is particularly advantageous in that the larger tools which normally should be driven at reduced or slow speeds should also have increased power instead of reduced power and inasmuch as there is no by-passing of fractions of the propelling medium under the increased pressures there is no loss of power resulting from that source.

The above applies only to the major changes in spindle speeds and is based upon the assumption that all of the rotors are of equal size and volumetric capacity. However, in such cases wherein it is desired to obtain various spindle speeds other than in simple harmonic progression, accompanied by disproportionate changes in shaft torque, it is proposed to connect various rotors of which the working areas of the respective vanes differ in size.

Referring to Fig. 2, let it be assumed that the working surface of the vane 21 in the work chamber 22 of rotor A represents a given area, it will then be noted that the effective area of the vane in the work chamber of rotor B is somewhat larger. Consequently, the fluid pressure acting upon the larger piston-like area will set up a greater turning moment upon the driven shaft than will the same pressure acting upon the smaller vane area of rotor A. And when both rotors A and B are connected in parallel the total torque on the shaft 23 is the combined force of the small rotor A and the large rotor B, and thus there may be effected major changes in speed which are disproportionate to each other and to the ultimate power value in the output shaft.

For larger and heavier classes of work a still further increase in turning power is desirable and to accomplish that end the diameters of the rotors may be varied as will now be explained.

Referring to Figs. 2, 4 and 5 it will be observed that the vanes of the rotor B, in addition to the fact that they are of larger effective area than the vanes of rotor A, are radially disposed further from the axis of rotation. As a consequence, the unit force acting upon the vanes of rotor B produces a greater turning force upon the shaft 23 than does the same unit force acting upon the vanes of rotor A.

As before explained, and in drilling machine tools particularly, the larger tools should be driven at slow speeds but with increased power, and by arranging a multiplicity of rotors of various sizes and capacities in the manner set forth above, the spindle may be rotated at various predetermined speeds, each one of which will be accompanied by change in power value commensurate with the increased or decreased speed.

In the drawings but three rotors, A, B and C are depicted which will serve to illustrate the principles of this invention but it will be understood that any number of rotors may be employed to give the desired range of speeds to the driven shaft.

The coupling of the various rotors may be effected in any suitable manner. I have preferred, however, to construct the unit with a selector valve built into the main casing so that any leakage that may occur about the rotors or valve takes place inside the main casing where it may serve as a lubricant and thereafter be drawn off as explained later.

Referring to Figs. 2, 4 and 8 the inlet and outlet ports of the motor unit are designated as 25 and 26 respectively, each of which communicate directly with an improved form of selector valve means. This valve means comprises three plungers $V_1$, $V_2$, $V_3$ arranged in parallelism and slidable in bores $V^1$, $V^2$ and $V^3$ formed in the sections 15$^a$ and 15$^b$ of the casing. Intermediate the ends of inlet and exit plungers $V_1$ and $V_3$ reduced portions 27 and 28 are formed which provide chambers for the passage of fluid therearound. The surface of by-pass plunger $V_2$ is unrelieved for a purpose later to be explained.

The inlet and outlet conduits 20$^a$ and 20$^b$ of each rotor communicate with the valve cylinders $V^1$ and $V^3$ respectively and when all valve plungers are in the position shown in Fig. 8, fluid from the supply conduit enters port 25, around reduced portion 27, conduit 20$^a$ of rotor A only, to chamber 19$^a$ and propels the rotor A clockwise. The discharge fluid leaves chamber 19$^b$, through 20$^b$, around portion 28 of the outlet plunger $V_3$ to the exhaust port 26. The rotor A and spindle shaft 5 is thereupon driven at a relatively rapid rate, the rotors B and C turning idly in their respective cylinders.

So that the rotors B and C do not act as pumps or produce any lag upon the spindle the lower ends of the three valve plungers are arranged to uncover cross-ports 27$^a$ and 28$^a$ so that there is a free passage between the inlet and outlet chambers of these rotors.

A control lever L provides convenient means for controlling the positioning of the triple plunger valve mechanism. As shown in Figs. 2 and 8 the upper end of the lever is secured to a shaft 32 journaled in the section 15$^a$ of the unit. Short levers 33$^a$ and 33$^b$ also connected to the shaft 32 have their free ends slidingly connected as at 34 with the valve rods $V_1$, $V_2$ and $V_3$ and thus when the control lever is oscillated the three valve plungers are reciprocated simultaneously. Spring detent means 35 associated with notches 36 on valve plunger $V_2$ serve as the retaining means for the valves.

The valves are illustrated in these figures in their extreme upward position whereupon only the rotor A is connected in the system. If the control lever L be actuated and the three valve plungers $V_1$, $V_2$ and $V_3$ lowered one position the intake and discharge channels 20$^a$ and 20$^b$ of the rotor B are also connected into the system in parallel with the rotor A. In this position the by-pass valve plunger $V_2$ closes or stops the flow in the cross-port 27$^a$ and isolates the intake and discharge channels of the rotor B.

Both of the rotors A and B now receive fluid from the common intake port 25 and since the volume of fluid supplied to the inlet port now drives two rotors instead of one, the rate of movement of the driven shaft is proportionately reduced.

When the valve plungers are moved downwardly to a third position, cross port 28ª is closed and the intake and discharge ports of rotor C are connected into the system, and a further major reduction in spindle speed results. Each reduction in spindle speed, it will be seen, is accompanied by an increase in the power output, firstly because of the increase in the area of the vanes of rotors B and C over the areas of the vanes of rotor A and secondly because of the increased lever arm of rotors B and C over the lever arm of rotor A. To facilitate movement of the plungers $V_1$, $V_2$, $V_3$ and to provide a drain for leakage, the lower ends of the chambers $V^1$, $V^2$ and $V^3$ communicate with each other and with line 29 leading to the reservoir R. Any surplus oil accumulating in the upper or lower sections of the unit passes through conduits 30 and 31 to drain pipe 32'.

From a practical standpoint a large number of rotors have certain disadvantages, for example, space limitations, weight, cost of manufacture, etc., and to obviate such difficulties it is proposed to employ a fewer number of rotors and insert in one of the fluid conduits a device for throttling or regulating the rate of flow of the fluid therein. By adjusting the throttle various rates, intermediate those accomplished by the selective coupling of the rotors, may be effected with but little loss in power.

Fig. 9 illustrates diagrammatically one such type of hydraulic circuit for accomplishing that end. In this figure P represents a pump or other normally constant source of fluid, usually oil, and R a reservoir from which the pump derives its fluid through the line 40. The discharge side of the pump is connected by line 41 with a reversing valve RV which reverses the direction of flow in lines 42 and 43 connected with the ports 25 and 26 respectively of the motor unit.

With the reversing valve in the position indicated in Fig. 9 the propelling fluid passes through line 42 to the intake port 25 of the rotor unit M. The fluid leaving the motor passes back to the reverse valve through the line 43 and thence to the reservoir R by way of line 44.

When the reverse valve is moved to the other position (dotted line position in Fig. 9) line 43 is connected to line 41 and becomes the forward pressure line and the line 42 is connected with line 44 and becomes the return line.

For the purpose of effecting various rates of speed intermediate those produced by the selective coupling of the rotors, a throttling device T is embodied in the circuit, the function of which is to effect variations in the rate of flow of the liquid through the motor M. As illustrated in the drawings, the throttling device T is preferably placed in an oil diverting conduit 45 connected with the forward pressure line 41 and in the present case comprises a valve mechanism having a regulatable flow orifice. When the throttle T is closed, the entire discharge of the pump P is caused to pass to the motor M, as hereinbefore explained. However, when the throttle T is wholly or partly opened a fraction of the pump discharge passes through the branch line 45 to the reservoir thereby diminishing the flow in the main branch 41ª leading to the motor. In this way the volume of fluid supplied to the motor may be varied thereby to cause variations in its rate of movement.

Under normal conditions of operation the throttle T is set so as to offer a resistance to the flow in the branch line 45 substantially equal to the resistance encountered by the motor M when under load so that the ratio of the flows in the two branches will remain constant and hence the rate of motor movement constant.

By adjusting the resistance of throttle T the flow from the source P may be suitably apportioned between the two branches and since one of the barnches conducts propelling fluid to the motor, the motor may be operated at various intermediate rates of speed.

As the percentage of the oil to be by-passed will be small, as compared with the amount utilized in driving the rotors the finer or intermediate speed changes are effected with but little loss in hydraulic power. It will be noted also that as more rotors are connected into the system, the percentage of the oil by-passed by reason of an adjustment of the throttle T, decreases. Consequently, when driving large tools at intermediate and low speeds, the power losses occasioned by by-passing a small percentage of the total volume supplied to the motor is comparatively slight. To guard against excessive pressures occurring in the system the relief valve r is provided.

Any suitable means, such as springs, cams, etc. may, of course, be employed cyclically to project the vanes 21 of the rotors to their normal working position. I have preferred, however, to use hydraulic fluid pressure acting at the rear of the various vanes for accomplishing that purpose.

Referring more particularly to Figs. 2, 4, 6 and 7, the fluid entering the conduit 20ª and slot 19ª to drive the respective rotors forward also enters branch ports 46 which lead to arcuate passages 48 by way of radial passages 47. The arcuate passages 48 are disposed at the rear of the vanes and communicate with the chambers 20 behind the vanes. Each vane is preferably provided with a tang 21ª, as shown most clearly in Fig. 10, to insure that the recess 20 will always communicate with the passages 48 when the vane is in proper angular position. As represented in dotted lines in Figs. 4, 5 and 6, the arcuate ports 48 extend only part way around the surface of discs 18, beginning at a point slightly in advance of inclined wall 22' and ending a short distance beyond the end of the inclined wall. By this means fluid pressure supplied by the pump acts upon the inner ends of the vanes and forces them outwardly thereby to assist in the rotation of the rotor and to maintain each vane in its outer working position until its succeeding vane becomes effective. After this point is reached the chamber 20 of the first mentioned vane is cut off from the supply channel 48 and communicates with another set of annular channels 49 connected with the discharge conduit 20ᵇ. Thus, as the rotor advances and the blades are caused to recede, the fluid at the rear thereof is ejected into channels 49, thence through conduits 50 and 51 to the discharge conduit 20ᵇ. When the direction of rotation is to be reversed the conduit 20ᵇ becomes the high pressure conduit and the flow to the rear of the vanes is also reversed, as will be understood.

While the drawings illustrate the vanes of the respective rotors in the same angular position it will be understood that by staggering the rotors with respect to each other a continuous and more steady drive free of pulsations and vibratory effects, results.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States.—

1. A variable speed hydraulic transmission combining a casing member having a central bore formed therein; a driven shaft journaled in said casing concentric with the axis of said bore; a plurality of independent motor units of equal external diameter fitted within said bore, each of said units comprising a non-rotatable stator element, having a power chamber formed therein at one side of a medial plane, the power chamber of each unit being of a different effective radial extent and rotor element operatively connected with said shaft and provided with a plurality of reciprocable vane members adapted to cooperate with its associated power chamber, a liquid intake port tangent to one end of said power chamber and a liquid exhaust port tangent to the other end of said power chamber, both of said ports lying in the plane of the stator and rotor elements, and a pair of cover plates sealing each of said units against leakage of propelling liquid from one unit to another; said units constituting complete assemblies of different capacities, and adapted to be inserted in said casing in any order selected, said casing member also having formed therein a plurality of pairs of conduits in parallel spaced planes, each pair of conduits comprising a supply conduit intersecting and tangent to the intake port of an associated motor unit, and a discharge conduit intersecting and tangent to the exhaust port of an associated motor unit, a main supply conduit in said casing common to all of said motor unit supply conduits, and a main discharge conduit in said casing common to all of said motor unit discharge conduits; and valve means in one of said main conduits for controlling the flow of propelling liquid through said motor units.

2. A variable speed hydraulic transmission combining a casing member having a central bore formed therein; a sleeve member journaled in said casing concentric with the axis of said bore; a shaft member translatable in said sleeve; a plurality of individual motor units of equal outside diameter mounted on said sleeve, each of said units comprising a cylinder liner fitted to said bore and normally fixed against movement relative to the casing and having a power chamber of a given size formed in its inner periphery at one side of a medial plane, the power chamber in each cylinder liner being of a different radial extent, a rotor element in each assembly splined to said sleeve and provided with a plurality of reciprocable vane members adapted to cooperate with said power chamber, each assembly also being provided with a liquid intake port tangent to one end of the power chamber formed therein and a liquid exhaust port tangent to the other end of said power chamber, and a pair of cover plates sealing each of said assemblies against leakage of propelling liquid from one assembly to another; said casing member also having formed therein a plurality of sets of liquid conduits, one set for each assembly, and each set of conduits comprising a supply conduit intersecting and tangential to the intake port of an associated assembly, and a discharge conduit intersecting and tangential to the exhaust port of the associated assembly; a main supply conduit common to all of said supply conduits; a main discharge conduit common to all of said discharge conduits; and valve means in one of said main conduits for selectively controlling the flow of pressure liquid from said main supply through one of said motor assemblies exclusively to effect a given rate of rotation of the shaft or through two or more of said assemblies simultaneously to effect a different rate of rotation of the shaft.

3. A variable speed hydraulic transmission adapted to be driven from a constant source of liquid supply combining a casing member; a driven shaft journaled in said casing; a plurality of individual motor units of different hydraulic capacities mounted on said shaft, each of said units comprising a non-rotatable stator element of the same outer diameter and each having a power chamber of a different radial extent formed therein at one side of a medial plane, a rotor element operatively connected with said shaft and provided with a plurality of reciprocable vane members adapted to cooperate with the associated power chamber, a liquid intake port tangent to one end of said power chamber and a liquid exhaust port tangent to the other end of said power chamber, both of said ports lying in the plane of the stator element, said casing member also having formed therein a pair of parallel conduits individual to each of said units, each pair of conduits comprising a supply conduit intersecting and tangent to the intake port of one of said units, and a discharge conduit intersecting and tangent to the exhaust port of each of said units; a main supply conduit common to all of said supply conduits and a main discharge conduit common to all of said discharge conduits; and valve means in said conduits for controlling the flow of propelling liquid through selected pairs of said conduits to effect propulsion of the motor unit associated therewith; and means for isolating the motor units not connected in the circuit from said main supply and discharge conduit.

4. A variable speed hydraulic transmission combining a casing member having a central bore formed therein; a sleeve member journaled in said casing concentric with the axis of said bore; a shaft member translatable in said sleeve; a plurality of individual motor assemblies mounted in said sleeve, each of said units being of the same external diameter to fit said bore, and each comprising a stator element normally fixed against movement relative to the casing having a power chamber formed in its inner periphery at one side of a medial plane, each of said power chambers being of a different radial extent, a rotor element splined to said sleeve and provided with a plurality of reciprocable vane members adapted to cooperate with said power chamber, each assembly also being provided with a liquid intake port and a liquid exhaust port in communication with its respective power chamber; said casing member also having formed therein a plurality of sets of liquid conduits, one set for each assembly, and each set of conduits comprising a supply conduit intersecting the intake port of an associated assembly, and a discharge conduit intersecting and the exhaust port of the associated assembly; a main supply conduit common to all of said supply conduits; a main discharge conduit common to all of said discharge conduits; a constant delivery source of propelling liquid; valve means in one of said main conduits for selectively controlling the flow of pressure liquid from said constant source through one of said motor assemblies exclusively to effect a given rate of rotation of the shaft or through two or more of said assemblies simultaneously to effect a different rate of rotation of the shaft; and means for diverting a fraction of the flow of liquid from said constant source to effect intermediate variations in the speed of the transmission.

5. A variable speed hydraulic transmission adapted to be driven from a constant source of liquid supply combining a casing member; a driven shaft journaled in said casing; a plurality of individual motor units of different axial widths mounted on said shaft, each of said units comprising a non-rotatable stator element of the same external diameter having a power chamber formed therein of a different radial extent, a rotor element operatively connected with said shaft and provided with a plurality of reciprocable vane members adapted to cooperate with its associated power chamber, a liquid intake port communicating with one end of said power chamber and a liquid exhaust port communicating with the other end of said power chamber, said casing member also having formed therein a pair of conduits individual to each of said units, each pair of conduits comprising a supply conduit intersecting the intake port of one of said units, and a discharge conduit intersecting the exhaust port of each of said units; a main supply conduit common to all of said supply conduits, and a main discharge conduit common to all of said discharge conduits; and valve means in said conduits for controlling the flow of propelling liquid through selected pairs of said conduits to effect propulsion of the motor unit associated therewith.

LAWRENCE LEE SCHAUER.